United States Patent Office 3,207,782
Patented Sept. 21, 1965

3,207,782
PROCESS FOR CRYSTALLIZATION OF
ALKALI METAL GLUTAMATES
Helmuth Müller, Heilbronn (Neckar), Germany, assignor to C. H. Knorr G.m.b.H., Heilbronn (Neckar), Germany, a corporation of Germany
No Drawing. Filed Nov. 14, 1960, Ser. No. 68,675
Claims priority, application Germany, Nov. 25, 1959,
K 39,265
9 Claims. (Cl. 260—534)

The present invention is directed to the crystallization of alkali metal glutamates from aqueous solutions thereof, and more particularly to a method which gives high yields.

Up to the present, the process consisted in heating the concentrated glutamate solution at elevated temperatures, holding the solution in a vacuum until the beginning of the crystallization, and then cooling the solution in an open vessel while stirring the solution. Thereby a part of the glutamate crystallized. The mass was treated in a centrifuge, whereby the first crystallization yielded about 50% of the glutamate in the mass.

This process was disadvantageous in that a large amount of mother liquor resulted, which had to be reprocessed. In addition, it was difficult to so conduct the operation as to obtain crystals of uniform size which could be readily centrifuged.

The present invention is intended and adapted to overcome the disadvantages of prior processes for crystallizing alkali metal glutamates, it being among the objects thereof to provide a process whereby a high yield is obtained, and the crystals are readily filterable.

It is also among the objects of the invention to devise a process which is simple, does not require complicated apparatus, and which is capable of producing crystals of high purity.

In accordance with the invention, it has been found that it is possible to obtain large crystals which can be readily centrifuged and with a yield for example, of 80% to 85% of the glutamate in the solution, by adding to a saturated solution of the glutamate, glutamic acid and a 40% to 50% aqueous solution of alkali metal hydroxide such as sodium hydroxide. The proportions of the glutamic acid and the alkali are such that the pH of the solution is about 6.5 to 7.0. The resulting solution becomes super-saturated and the newly formed glutamate separates in the form of large crystals. Only that part of the glutamate does not crystallize which is in solution in the small amount of water introduced with the alkali.

Various advantages are inherent in the present invention. The pH may be maintained in the desired range by a simple automatic apparatus. The supersaturation of the glutamate is so easily obtained that the glutamate precipitate is in practically quantitative yields. Because of the coarseness of the crystals, the centrifugal separation is rapid and complete. A high yield is obtained and a relatively small amount of mother liquor results. The cost of energy necessary in the operation is greatly reduced, as no vaporization of water is necessary.

The invention is further characterized in that the addition of glutamic acid and alkali is conducted at temperatures of about 50° to 60° C. Preferably, about 100 to 200 grams of glutamic acid and equimolecular amounts of about 40% to 50% alkali solution are introduced per kilogram of solution per hour. When the reaction mixture reaches a dry substance content of about 52° to 53° Bx (Brix) as determined by a refractometer, it is seeded or inoculated with a small amount of sodium glutamate. The reaction may be conducted so that during the crystallization the dry substance content does not exceed about 56° Bx. The crystal-containing mass may be allowed to cool over a period of about 24 to 48 hours, and then centrifuged. About two-thirds of the mother liquor may be bleached, filtered, and added to the following crystallization operation.

In particular, the process may be conducted as follows:
There is provided a saturated solution of sodium glutamate obtained either by the reaction of glutamic acid and sodium hydroxide or the crystals obtained from an earlier operation. A temperature of 50° to 60° C. is maintained therein with vigorous stirring, and glutamic acid and about a 50% solution of sodium hydroxide, are added in proportions to give a pH of 6.5 to 7.0, which addition may be automatically controlled. After the reaction mixture has reached a concentration of 52° to 53° Bx, it is inoculated with ground glutamate crystals, but the concentration is not allowed to exceed 56° Bx to avoid formation of fine crystals.

The glutamic acid is introduced in the amount of 100 to 200 g./kg. of glutamate solution, per hour. It is desirable to introduce an amount of glutamic acid which corresponds with the glutamate solution. After the end of the reaction, the crystal mass may be stirred for 24 to 48 hours while cooling, and the product centrifuged. The coarse crystals are dried in the air. The mother liquor is bleached and filtered, and about two-thirds thereof added to the next operation; the remainder of the liquor is applied to the crystallization of crude glutamic acid.

The following examples illustrate the invention:

Example 1

50 kg. of a saturated aqueous solution of sodium glutamate are heated to 60° C. Under vigorous stirring 50 kg. of dry 99% glutamic acid and 28.3 kg. of a 48% aqueous sodium hydroxide are added over a period of 5 to 8 hours; the amounts being proportioned to obtain and maintain a pH of 6.5 to 7.0. The product is cooled with stirring over a period of 24 to 48 hours, centrifuged and dried.

A yield of 52.9 kg. of glutamate is obtained, the purity being at least 99%. About 74.5 kg. of mother liquor results; it is heated to about 50° C. to 60° C., bleached with about 1% to 2% of carbon and filtered. 50 kg. of the liquor are applied to the following cycle and the rest used in the crystallization of crude glutamic acid.

Example 2

The yield may be calculated in the following manner:
For the reaction of 147 kg. of glutamic acid (1000 mol.), 1000 mol. of sodium hydroxide are necessary. This equals 83.3 kg. of 48% NaOH containing 43.3 kg. of water. The saturated glutamate solution at room temperature contains 42% of glutamate. In the 43.3 kg. of water there is held $$\frac{43.3}{58} \times 42 = 31.4 \text{ kg. of glutamate}$$

This amount is subtracted from the total yield. Since from 147 kg. of glutamic acid, 187 kg. of glutamate are obtained, the expected yield is $$\frac{187 - 31.4}{187} \times 100 = 83.2\%$$

Although the invention has been described setting forth a preferred embodiment thereof, the invention is not to be limited thereto, but is to be broadly construed in accordance with the claims appended hereto.

What is claimed is:
1. A method of crystallizing alkali metal glutamate which comprises providing a substantially saturated aqueous solution of said glutamate, adding thereto dry glu- tamic acid and about a 40% to 50% aqueous solution of alkali metal hydroxide over a period of time and in such proportions as to maintain a pH of about 6.5 to 7.0, and allowing the mass to stand to crystallize said glutamate.

2. A method according to claim 1 characterized in that the alkali metal is sodium.

3. A method according to claim 1 characterized in that a temperature of about 50° to 60° C. is maintained.

4. A method according to claim 1 characterized in that the rate of addition of the glutamic acid is about 100 to 200 g./kg. of solution, per hour.

5. A method according to claim 1 characterized in that the rate of addition of the glutamic acid is about 100 to 200 g./kg. of solution, per hour, and an equimolecular amount of said hydroxide is added per hour.

6. A method according to claim 1 characterized in that the reaction mixture is inoculated.

7. A method according to claim 1 characterized in that the reaction mixture is inoculated when the dry substance content of the reaction mixture is between about 52° and 56° Bx.

8. A method according to claim 1 characterized in that the mass is cooled over a period of about 24 to 48 hours and then the crystals are recovered from the mass.

9. A method according to claim 1 characterized in that the crystals are separated from the mother liquor and at least a part of said mother liquor is returned to the cycle.

References Cited by the Examiner
UNITED STATES PATENTS 2,306,646 12/42 Shildneck.
2,829,161 4/58 Shafor et al.
2,882,302 4/59 Fike.

LORRAINE A. WEINBERGER, *Primary Examiner.*

LEON ZITVER, CHARLES B. PARKER, *Examiners.*